C. B. JOHNSON & H. H. SMITH.
NUT LOCK.
APPLICATION FILED JAN. 24, 1908. RENEWED JAN. 10, 1910.

952,810.

Patented Mar. 22, 1910.

Witnesses
Benj. Finckel
Alice B. Cook

Inventors
Charles B. Johnson
Harvey H. Smith
By Finckel & Finckel
his Attorneys

UNITED STATES PATENT OFFICE.

CHARLES B. JOHNSON AND HARVEY H. SMITH, OF COLUMBUS, OHIO.

NUT-LOCK.

952,810.  Specification of Letters Patent.  Patented Mar. 22, 1910.

Application filed January 24, 1908, Serial No. 412,413. Renewed January 10, 1910. Serial No. 537,346.

*To all whom it may concern:*

Be it known that we, CHARLES B. JOHNSON and HARVEY H. SMITH, citizens of the United States, residing at Columbus, in the county of Franklin and State of Ohio, have invented a certain new and useful Improvement in Nut-Locks, of which the following is a specification.

The object of this invention is to provide a simple, cheap and effective device to lock or resist the turning of a nut after it has been turned to object-holding position on a thread.

The invention is embodied in a thin threaded washer having on its operative face a spiral wedge-like projection that, when turned up tightly against the nut to be held, tends at its high part to spring the adjacent part of the washer so that, even if the nut should, because of extraordinary circumstances, turn a little, the washer will continue to press upon the nut and tend to resist its turning.

Figure 1:
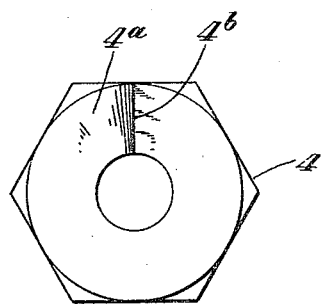
Figure 2:
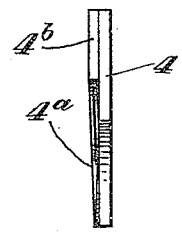
Figure 3:
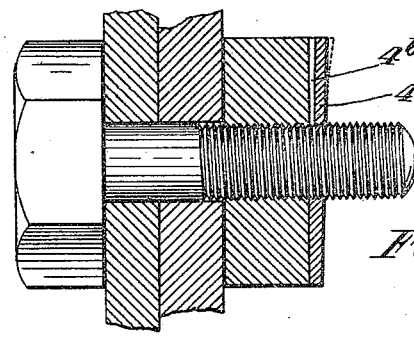

In the accompanying drawing—Figure 1 is an elevation of the inner or operative face of the washer; Fig. 2 is an edge view of the washer; Fig. 3 is a sectional view through a washer and nut showing them in locked position on a bolt.

In the views 4 designates the body of the washer. The washer is made of uniform thickness but as thin as practicable consistently with the strength desired and its capacity to be threaded for application to the bolt containing the nut to be locked. The operative or locking face of the washer is made with spiral projection $4^a$ that has a broad flat face and terminates in preferably a square high shoulder $4^b$ having its edge standing radially to the axis of the washer. The junction of said shoulder with the spiral projection forms a sharp or acute penetrating edge. The spiral projection extends around about three-quarters of the circumference of the washer so as to constitute a thin and powerful wedge. When turned up tightly against a nut to be locked the aforesaid sharp or acute penetrating edge at the shoulder $4^b$ tends to bite into the nut and to spring the body of the contiguous washer outward as shown by dotted lines Fig. 3. When the washer is so sprung there is stored in it a reserve of pressure tending to resist the turning of the nut even after it has been turned somewhat in the off direction.

What we claim and desire to secure by Letters Patent is:

1. A nut lock consisting of a thin threaded washer-like device of uniform thickness in its body portion, but having on its nut-facing side and integral therewith a spiral projection of gradually increasing thickness. the face of which is broad and flat and which terminates at its high end in a single radial shoulder at one side of the axis of the washer body and forms a sharp or acute penetrating radial edge.

2. A nut lock consisting of a thin threaded washer-like device of uniform thickness in its body portion, but having on its nut-facing side and integral therewith a spiral wedge-like broad projection of gradually increasing thickness that terminates at its high end in a single radial shoulder at one side of the axis of the washer body and forms a sharp or acute penetrating radial edge, the washer being adapted to be sprung at said shoulder when turned tightly up against a nut.

CHARLES B. JOHNSON.
HARVEY H. SMITH.

Witnesses:
 Mrs. H. P. LEGG,
 TROY T. TOMLINSON.